(12) United States Patent
Briscoe et al.

(10) Patent No.: US 12,097,751 B2
(45) Date of Patent: *Sep. 24, 2024

(54) METHODS AND SYSTEMS FOR PROVIDING PREDICTIVE ENERGY CONSUMPTION FEEDBACK FOR POWERING A TRANSPORT CLIMATE CONTROL SYSTEM

(71) Applicant: THERMO KING LLC, Minneapolis, MN (US)

(72) Inventors: Casey Briscoe, Minnetonka, MN (US); Grant A. Baumgardner, Minneapolis, MN (US); Wallace Stephen Hubbard, Chanhassen, MN (US); Mark D. Leasure, Eagan, MN (US); Ryan Wayne Schumacher, Bloomington, MN (US); Panayu Robert Srichai, Minneapolis, MN (US); Matthew Srnec, Minnetonka, MN (US); Philip Lewis Lavrich, Mooresville, NC (US)

(73) Assignee: THERMO KING LLC, Minneapolis, MN (US)

( * ) Notice: Subject to any disclaimer, the term of this patent is extended or adjusted under 35 U.S.C. 154(b) by 492 days.

This patent is subject to a terminal disclaimer.

(21) Appl. No.: 17/420,022

(22) PCT Filed: Dec. 31, 2018

(86) PCT No.: PCT/US2018/068136
§ 371 (c)(1),
(2) Date: Jun. 30, 2021

(87) PCT Pub. No.: WO2020/142063
PCT Pub. Date: Jul. 9, 2020

(65) Prior Publication Data
US 2022/0088997 A1    Mar. 24, 2022

(51) Int. Cl.
*B60H 1/00* (2006.01)
*G07C 5/00* (2006.01)
(Continued)

(52) U.S. Cl.
CPC ..... *B60H 1/00978* (2013.01); *B60H 1/00014* (2013.01); *B60H 1/00364* (2013.01);
(Continued)

(58) Field of Classification Search
CPC ........ B60L 2200/28; B60L 1/02; B60L 50/60; B60L 2240/64; B60L 2240/66;
(Continued)

(56) References Cited

U.S. PATENT DOCUMENTS

| 3,875,483 A | 4/1975 | Farr |
| 5,104,037 A | 4/1992 | Karg et al. |

(Continued)

FOREIGN PATENT DOCUMENTS

| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Steven B Theriault
(74) *Attorney, Agent, or Firm* — HSML P.C.

(57) ABSTRACT

Systems and methods are provided for providing predictive energy consumption feedback for powering a transport climate control system. This can include determining whether an energy level of an energy storage source is greater than an expected energy consumption of a transport (Continued)

climate control system during a route, based on route parameters. The route parameters may be obtained via a human-machine interface. When the energy storage source is less than the expected energy consumption, a user is alerted. The systems and methods may further compare the energy level to an expected energy level during transit to determine if the energy level is greater or less than expected and alert the user when the energy level is less than expected.

20 Claims, 6 Drawing Sheets

(51) Int. Cl.
B60H 1/32 (2006.01)
B60P 3/20 (2006.01)
G06Q 30/0283 (2023.01)
G06Q 50/06 (2012.01)

(52) U.S. Cl.
CPC ..... *B60H 1/00771* (2013.01); *B60H 1/00985* (2013.01); *G07C 5/004* (2013.01); *B60H 1/3232* (2013.01); *B60P 3/20* (2013.01); *G06Q 30/0283* (2013.01); *G06Q 50/06* (2013.01)

(58) Field of Classification Search
CPC . B60L 2270/46; B60L 2240/34; B62D 53/06; B60K 11/06; B60H 1/3232; B60P 3/20; B60Y 2200/148; B60Y 2200/147; Y02T 10/70; Y02T 10/62; G05B 15/02; G05B 19/4185; G05B 19/4183; H04I 67/12; H04I 29/7869
See application file for complete search history.

(56) References Cited

U.S. PATENT DOCUMENTS

| 5,231,849 | A | 8/1993 | Rosenblatt |
| 6,034,445 | A | 3/2000 | Hewitt |
| 6,234,398 | B1* | 5/2001 | Pawlak, III .......... B60H 1/0073 62/133 |
| 6,280,320 | B1 | 8/2001 | Paschke et al. |
| 6,487,869 | B1 | 12/2002 | Sulc et al. |
| 6,518,727 | B2 | 2/2003 | Domura et al. |
| 6,560,980 | B2 | 5/2003 | Gustafson et al. |
| 6,600,237 | B1 | 7/2003 | Meissner |
| 6,631,080 | B2 | 10/2003 | Trimble et al. |
| 6,652,330 | B1 | 11/2003 | Wasilewski |
| 6,700,214 | B2 | 3/2004 | Ulinski et al. |
| 6,753,692 | B2 | 6/2004 | Toyomura et al. |
| 6,925,826 | B2 | 8/2005 | Hille et al. |
| 7,011,902 | B2 | 3/2006 | Pearson |
| 7,120,539 | B2 | 10/2006 | Krull et al. |
| 7,122,923 | B2 | 10/2006 | Lafontaine et al. |
| 7,151,326 | B2 | 12/2006 | Jordan |
| 7,176,658 | B2 | 2/2007 | Quazi et al. |
| 7,206,692 | B2 | 4/2007 | Beesley et al. |
| 7,327,123 | B2 | 2/2008 | Faberman et al. |
| 7,424,343 | B2 | 9/2008 | Kates |
| 7,449,798 | B2 | 11/2008 | Suzuki et al. |
| 7,532,960 | B2 | 5/2009 | Kumar |
| 7,728,546 | B2 | 6/2010 | Tanaka et al. |
| 7,730,981 | B2 | 6/2010 | McCabe et al. |
| 7,745,953 | B2 | 6/2010 | Puccetti et al. |
| 7,806,796 | B2 | 10/2010 | Zhu |
| 7,830,117 | B2 | 11/2010 | Ambrosio et al. |
| 7,898,111 | B1 | 3/2011 | Pistel |
| 7,900,462 | B2 | 3/2011 | Hegar et al. |
| 7,937,244 | B2* | 5/2011 | Kadaba .................... G07C 5/08 340/572.1 |
| 8,020,651 | B2 | 9/2011 | Zillmer et al. |
| 8,030,880 | B2 | 10/2011 | Alston et al. |
| 8,134,339 | B2 | 3/2012 | Burlak et al. |
| 8,170,886 | B2 | 5/2012 | Luff |
| 8,214,141 | B2 | 7/2012 | Froeberg |
| 8,286,437 | B2* | 10/2012 | Sanders ................ F25D 29/003 62/62 |
| 8,295,950 | B1 | 10/2012 | Wordsworth et al. |
| 8,381,540 | B2 | 2/2013 | Alston |
| 8,441,228 | B2 | 5/2013 | Brabec |
| 8,476,872 | B2 | 7/2013 | Truckenbrod et al. |
| 8,487,458 | B2 | 7/2013 | Steele et al. |
| 8,541,905 | B2 | 9/2013 | Brabec |
| 8,602,141 | B2 | 12/2013 | Yee et al. |
| 8,626,367 | B2 | 1/2014 | Krueger et al. |
| 8,626,419 | B2 | 1/2014 | Mitchell et al. |
| 8,643,216 | B2 | 2/2014 | Lattin |
| 8,643,217 | B2 | 2/2014 | Gietzold et al. |
| 8,670,225 | B2 | 3/2014 | Nunes |
| 8,723,344 | B1 | 5/2014 | Dierickx |
| 8,742,620 | B1 | 6/2014 | Brennan et al. |
| 8,760,115 | B2 | 6/2014 | Kinser et al. |
| 8,764,469 | B2 | 7/2014 | Lamb |
| 8,767,379 | B2 | 7/2014 | Whitaker |
| 8,818,588 | B2 | 8/2014 | Ambrosio et al. |
| 8,862,356 | B2 | 10/2014 | Miller |
| 8,912,683 | B2 | 12/2014 | Dames et al. |
| 8,924,057 | B2 | 12/2014 | Kinser et al. |
| 8,978,798 | B2 | 5/2015 | Dalum et al. |
| 9,030,336 | B2 | 5/2015 | Doyle |
| 9,037,302 | B2* | 5/2015 | O'Neill .................... F24F 11/64 700/276 |
| 9,061,680 | B2 | 6/2015 | Dalum |
| 9,093,788 | B2 | 7/2015 | Lamb |
| 9,102,241 | B2 | 8/2015 | Brabec |
| 9,147,335 | B2 | 9/2015 | Raghunathan et al. |
| 9,199,543 | B2 | 12/2015 | Okamoto et al. |
| 9,313,616 | B2 | 4/2016 | Mitchell et al. |
| 9,352,635 | B1* | 5/2016 | Schepmann ......... B60H 1/00392 |
| 9,400,966 | B2* | 7/2016 | Dertadian ................ F25D 3/08 |
| 9,436,853 | B1 | 9/2016 | Meyers |
| 9,440,507 | B2 | 9/2016 | Giovanardi et al. |
| 9,463,681 | B2 | 10/2016 | Olaleye et al. |
| 9,464,839 | B2 | 10/2016 | Rusignuolo et al. |
| 9,557,100 | B2* | 1/2017 | Chopko ............... B60H 1/3211 |
| 9,562,715 | B2 | 2/2017 | Kundasamy |
| 9,694,697 | B2 | 7/2017 | Brabec |
| 9,738,160 | B2 | 8/2017 | Bae et al. |
| 9,758,013 | B2 | 9/2017 | Steele |
| 9,783,024 | B2 | 10/2017 | Connell et al. |
| 9,784,780 | B2 | 10/2017 | Loftus et al. |
| 9,802,482 | B2 | 10/2017 | Schumacher et al. |
| 9,825,549 | B2 | 11/2017 | Choi et al. |
| 9,829,329 | B2* | 11/2017 | Nagy .................. G01C 21/3469 |
| 9,846,086 | B1 | 12/2017 | Robinson et al. |
| 9,889,724 | B2* | 2/2018 | Chen .................... F25D 29/003 |
| 9,893,545 | B2 | 2/2018 | Bean |
| 9,920,971 | B2* | 3/2018 | Jin ...................... B60H 1/3232 |
| 9,931,960 | B2 | 4/2018 | Tabatowski-Bush et al. |
| 9,975,403 | B2 | 5/2018 | Rusignuolo et al. |
| 9,975,446 | B2 | 5/2018 | Weber et al. |
| 9,987,906 | B2 | 6/2018 | Kennedy |
| 10,000,122 | B2 | 6/2018 | Wu et al. |
| 10,048,082 | B2* | 8/2018 | Meyer ................ G01C 21/3469 |
| 10,148,212 | B2 | 12/2018 | Schumacher et al. |
| 10,230,236 | B2 | 3/2019 | Schumacher et al. |
| 10,240,847 | B1 | 3/2019 | Thomas, Jr. |
| 10,353,410 | B2* | 7/2019 | Bates .................... B60H 1/3232 |
| 1,042,753 | A1 | 10/2019 | Symanow et al. |
| 10,538,211 | B2* | 1/2020 | Srnec ..................... H02J 7/0068 |
| 10,562,377 | B2* | 2/2020 | Vehr ...................... B60L 53/14 |
| 10,591,207 | B2* | 3/2020 | Beasley ................ F25D 29/003 |
| 10,612,933 | B1* | 4/2020 | Ledet ................. G01C 21/3469 |
| 10,634,409 | B2* | 4/2020 | Jin ...................... B60H 1/00014 |
| 10,682,897 | B2* | 6/2020 | Lucht .................... B60H 1/3222 |
| 10,748,109 | B2* | 8/2020 | Benjamin .......... G06Q 10/0832 |
| 10,875,497 | B2 | 12/2020 | Smec |
| 10,995,760 | B1 | 5/2021 | Stubbs |
| 11,034,213 | B2 | 6/2021 | Wenger et al. |
| 11,155,143 | B2* | 10/2021 | Adetola ............. B60H 1/00771 |
| 11,176,510 | B2* | 11/2021 | Beasley ................ A23L 3/3418 |

(56) References Cited

U.S. PATENT DOCUMENTS

| | | | |
|---|---|---|---|
| 11,339,998 B2* | 5/2022 | Saroka | H01M 10/425 |
| 11,365,932 B2* | 6/2022 | Gough | F25D 29/003 |
| 2001/0025349 A1 | 9/2001 | Sharood et al. | |
| 2002/0113576 A1 | 8/2002 | Domura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2003/0201097 A1 | 10/2003 | Zeigler et al. | |
| 2004/0168455 A1 | 9/2004 | Nakamura | |
| 2005/0057210 A1 | 3/2005 | Jeda et al. | |
| 2005/0065684 A1 | 3/2005 | Larson et al. | |
| 2005/0285445 A1 | 12/2005 | Wruck et al. | |
| 2006/0284601 A1 | 12/2006 | Salasoo et al. | |
| 2007/0052241 A1 | 3/2007 | Pacy | |
| 2007/0192116 A1 | 8/2007 | Levitt | |
| 2007/0227161 A1* | 10/2007 | Boer | F25D 29/00 62/172 |
| 2008/0147270 A1 | 6/2008 | Sakane et al. | |
| 2008/0177678 A1 | 7/2008 | Di Martini et al. | |
| 2008/0281473 A1 | 11/2008 | Pitt | |
| 2009/0121798 A1 | 5/2009 | Levinson | |
| 2009/0122901 A1 | 5/2009 | Choi et al. | |
| 2009/0126901 A1 | 5/2009 | Hegar et al. | |
| 2009/0178424 A1 | 7/2009 | Hwang et al. | |
| 2009/0195349 A1 | 8/2009 | Frader-Thompson et al. | |
| 2009/0228155 A1* | 9/2009 | Slifkin | B60H 1/3232 700/299 |
| 2009/0229288 A1 | 9/2009 | Alston et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0089669 A1 | 4/2010 | Taguch | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0118916 A1 | 5/2011 | Gullichsen | |
| 2011/0162395 A1 | 7/2011 | Chakiachvili et al. | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2011/0265506 A1 | 11/2011 | Alston | |
| 2011/0290893 A1 | 12/2011 | Steinberg | |
| 2012/0000212 A1* | 1/2012 | Sanders | F25D 29/003 236/51 |
| 2012/0116931 A1 | 5/2012 | Meyers | |
| 2012/0153722 A1 | 6/2012 | Nazarian | |
| 2012/0198866 A1 | 8/2012 | Zeidner | |
| 2012/0209465 A1* | 8/2012 | Dehmann | B60W 10/24 701/123 |
| 2012/0245772 A1 | 9/2012 | King | |
| 2012/0310376 A1 | 12/2012 | Krumm et al. | |
| 2012/0310416 A1 | 12/2012 | Tepper et al. | |
| 2013/0000342 A1 | 1/2013 | Blasko et al. | |
| 2013/0073094 A1 | 3/2013 | Knapton et al. | |
| 2013/0088900 A1 | 4/2013 | Park | |
| 2013/0158828 A1 | 6/2013 | McAlister | |
| 2013/0175975 A1 | 7/2013 | Shinozaki | |
| 2013/0197730 A1 | 8/2013 | Huntzicker | |
| 2013/0197748 A1 | 8/2013 | Whitaker | |
| 2013/0231808 A1 | 9/2013 | Flath et al. | |
| 2013/0271290 A1* | 10/2013 | Saenz | G05D 27/02 340/870.07 |
| 2013/0338855 A1* | 12/2013 | Mason | G07C 5/008 701/2 |
| 2014/0018969 A1 | 1/2014 | Forbes, Jr. | |
| 2014/0020414 A1 | 1/2014 | Rusignuolo et al. | |
| 2014/0026599 A1 | 1/2014 | Rusignuolo et al. | |
| 2014/0060097 A1 | 3/2014 | Perreault | |
| 2014/0137590 A1 | 5/2014 | Chopko et al. | |
| 2014/0203760 A1 | 7/2014 | Lammers | |
| 2014/0230470 A1 | 8/2014 | Cook | |
| 2014/0265560 A1 | 9/2014 | Leehey et al. | |
| 2014/0283533 A1 | 9/2014 | Kurtzman et al. | |
| 2014/0335711 A1 | 11/2014 | Lamb | |
| 2014/0343741 A1 | 11/2014 | Clarke | |
| 2015/0019132 A1 | 1/2015 | Gusikhin et al. | |
| 2015/0081212 A1 | 3/2015 | Mitchell et al. | |
| 2015/0121923 A1 | 5/2015 | Rusignuolo et al. | |
| 2015/0168032 A1 | 6/2015 | Steele | |
| 2015/0188360 A1 | 7/2015 | Doane et al. | |
| 2015/0226475 A1* | 8/2015 | Choi | F25D 29/00 62/158 |
| 2015/0246593 A1 | 9/2015 | Larson et al. | |
| 2015/0306937 A1 | 10/2015 | Kitamura et al. | |
| 2015/0316301 A1 | 11/2015 | Kolda et al. | |
| 2015/0344044 A1 | 12/2015 | Yuasa | |
| 2015/0345958 A1 | 12/2015 | Graham | |
| 2015/0355288 A1 | 12/2015 | Yokoyama et al. | |
| 2015/0360568 A1 | 12/2015 | Champagne et al. | |
| 2016/0011001 A1 | 1/2016 | Emory et al. | |
| 2016/0035152 A1 | 2/2016 | Kargupta | |
| 2016/0061610 A1* | 3/2016 | Meyer | B60L 58/12 701/22 |
| 2016/0061616 A1* | 3/2016 | Meyer | G01C 21/3469 701/123 |
| 2016/0068121 A1* | 3/2016 | Maini | B60R 16/03 307/10.1 |
| 2016/0089994 A1 | 3/2016 | Keller et al. | |
| 2016/0097652 A1* | 4/2016 | Liu | G01C 21/3469 701/423 |
| 2016/0144764 A1 | 5/2016 | Dutta et al. | |
| 2016/0156258 A1 | 6/2016 | Yokoyama | |
| 2016/0167642 A1* | 6/2016 | Debert | B60W 20/12 180/65.265 |
| 2016/0252289 A1 | 9/2016 | Feng et al. | |
| 2016/0280040 A1 | 9/2016 | Connell et al. | |
| 2016/0285416 A1 | 9/2016 | Tiwari et al. | |
| 2016/0291622 A1 | 10/2016 | Al-Mohssen et al. | |
| 2016/0305791 A1* | 10/2016 | Neubecker | B60L 58/12 |
| 2016/0327921 A1 | 11/2016 | Ribbich et al. | |
| 2016/0377309 A1 | 12/2016 | Abiprojo et al. | |
| 2017/0030728 A1* | 2/2017 | Baglino | G01C 21/3469 |
| 2017/0057323 A1 | 3/2017 | Neu et al. | |
| 2017/0063248 A1 | 3/2017 | Lee et al. | |
| 2017/0082335 A1* | 3/2017 | Jin | B60H 1/3232 |
| 2017/0098954 A1 | 4/2017 | Ferguson et al. | |
| 2017/0107910 A1 | 4/2017 | Huang | |
| 2017/0190263 A1 | 7/2017 | Enzinger et al. | |
| 2017/0210194 A1 | 7/2017 | Ling | |
| 2017/0217280 A1 | 8/2017 | Larson et al. | |
| 2017/0219374 A1 | 8/2017 | Sitarski et al. | |
| 2017/0237355 A1 | 8/2017 | Stieneker et al. | |
| 2017/0259764 A1 | 9/2017 | Da Silva Carvalho et al. | |
| 2017/0302200 A1 | 10/2017 | Marcinkiewicz | |
| 2017/0323258 A1* | 11/2017 | Semsey | G01C 21/20 |
| 2017/0349078 A1 | 12/2017 | Dziuba et al. | |
| 2018/0022187 A1 | 1/2018 | Connell et al. | |
| 2018/0029436 A1* | 2/2018 | Zaeri | B60H 1/3232 |
| 2018/0029488 A1 | 2/2018 | Sjödin | |
| 2018/0087813 A1 | 3/2018 | Senf, Jr. | |
| 2018/0093655 A1* | 4/2018 | Healy | B60L 50/40 |
| 2018/0111441 A1 | 4/2018 | Menard et al. | |
| 2018/0154723 A1 | 6/2018 | Anderson et al. | |
| 2018/0170349 A1 | 6/2018 | Jobson et al. | |
| 2018/0201092 A1 | 7/2018 | Ahuja et al. | |
| 2018/0203443 A1 | 7/2018 | Newman | |
| 2018/0222278 A1 | 8/2018 | Mizuma | |
| 2018/0238698 A1 | 8/2018 | Pedersen | |
| 2018/0306533 A1 | 10/2018 | Alahyari et al. | |
| 2018/0326813 A1 | 11/2018 | Ganiere | |
| 2018/0334012 A1 | 11/2018 | Geller et al. | |
| 2018/0342876 A1 | 11/2018 | Agnew et al. | |
| 2018/0342877 A1 | 11/2018 | Yoo et al. | |
| 2018/0356870 A1 | 12/2018 | Rusignuolo et al. | |
| 2019/0047496 A1 | 2/2019 | Sufrin-Disler et al. | |
| 2019/0081489 A1 | 3/2019 | Gerber et al. | |
| 2019/0086138 A1 | 3/2019 | Chopko et al. | |
| 2019/0092122 A1 | 3/2019 | Vanous et al. | |
| 2019/0123544 A1 | 4/2019 | Pelegris et al. | |
| 2019/0184838 A1 | 6/2019 | Lee et al. | |
| 2019/0219412 A1* | 7/2019 | Melatti | G01C 21/3667 |

(56) References Cited

U.S. PATENT DOCUMENTS

| | | | |
|---|---|---|---|
| 2019/0242716 A1* | 8/2019 | N | G06Q 10/0832 |
| 2019/0255914 A1 | 8/2019 | Keda et al. | |
| 2019/0277561 A1 | 9/2019 | Spath | |
| 2019/0277647 A1 | 9/2019 | Adetola et al. | |
| 2019/0283536 A1 | 9/2019 | Suzuki et al. | |
| 2019/0283541 A1 | 9/2019 | Adetola et al. | |
| 2019/0308487 A1 | 10/2019 | Badger et al. | |
| 2020/0050753 A1 | 2/2020 | Davis et al. | |
| 2020/0076029 A1 | 3/2020 | Litz | |
| 2020/0086744 A1 | 3/2020 | Schumacher et al. | |
| 2020/0089241 A1* | 3/2020 | Kao | G05D 1/0217 |
| 2020/0101820 A1* | 4/2020 | Wenger | B60H 1/00371 |
| 2020/0106271 A1 | 4/2020 | Rydkin et al. | |
| 2020/0130471 A1 | 4/2020 | Leasure | |
| 2020/0130473 A1 | 4/2020 | Schumacher et al. | |
| 2020/0130645 A1 | 4/2020 | Srnec | |
| 2020/0136504 A1 | 4/2020 | Schumacher et al. | |
| 2020/0189361 A1 | 6/2020 | Radcliff | |
| 2020/0207184 A1 | 7/2020 | Schumacher et al. | |
| 2020/0231041 A1 | 7/2020 | Avrich et al. | |
| 2021/0061156 A1 | 3/2021 | Swab | |
| 2022/0080806 A1* | 3/2022 | Lavrich | G07C 5/0816 |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| DE | 102014208015 | 10/2015 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 2768693 | 5/2019 |
| EP | 536552 | 9/2019 |
| EP | 3540340 | 9/2019 |
| EP | 3536552 | 11/2019 |
| GB | 2551999 | 1/2018 |
| IN | 106774131 | 5/2017 |
| JP | 2000158930 | 6/2000 |
| JP | 2007320352 | 12/2007 |
| JP | 2009243780 | 10/2009 |
| JP | 5772439 | 9/2015 |
| JP | 2018-136090 | 8/2018 |
| JP | 2019145521 | 8/2019 |
| KR | 10-2012-0092834 | 8/2012 |
| NO | 2013075623 | 5/2013 |
| SE | 541327 | 7/2019 |
| WO | 03038988 | 5/2003 |
| WO | 2008153518 | 12/2008 |
| WO | 2009155941 | 12/2009 |
| WO | 2010065476 | 6/2010 |
| WO | 2011066468 | 6/2011 |
| WO | 2011094099 | 8/2011 |
| WO | 2012138497 | 10/2012 |
| WO | 2012138500 | 10/2012 |
| WO | 2013096084 | 6/2013 |
| WO | 2014002244 | 1/2014 |
| WO | 2014/058610 | 4/2014 |
| WO | 2014085672 | 6/2014 |
| WO | 2014106060 | 7/2014 |
| WO | 2014106068 | 7/2014 |
| WO | 2016038838 | 3/2016 |
| WO | 2016145107 | 9/2016 |
| WO | 2017058660 | 4/2017 |
| WO | 2017/083336 | 5/2017 |
| WO | 2017083333 | 5/2017 |
| WO | 2017151698 | 9/2017 |
| WO | 2017/172855 | 10/2017 |
| WO | 2017172484 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/009798 | 1/2018 |
| WO | 2018/017450 | 1/2018 |
| WO | 2018005957 | 1/2018 |
| WO | 2018009646 | 1/2018 |
| WO | 2018017818 | 1/2018 |
| WO | 2018029502 | 2/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", ZOEKEN, Jul. 28, 2015, 7 pages, available at: https:/iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System ", filed Sep. 9, 2019, 59 pages.

U.S. Appl. No. 16/730,126, titled "Transport Climate Control System Power Architecture", filed Dec. 30, 2019, 27 pages.

U.S. Appl. No. 16/574,754, titled "Methods and Systems for Energy Management of a Transport Climate Control System", filed Sep. 18, 2019, 50 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/176,720, titled "Methods and Systems for Augmenting a Vehicle Powered Transport Climate Control System", filed Oct. 31, 2018, 41 pages.

(56) References Cited

OTHER PUBLICATIONS

U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Operation of a Transport Climate Control System", filed Dec. 28, 2018, 41 pages.
U.S. Appl. No. 16/574,775, titled "Methods and Systems for Power and Load Management of a Transport Climate Control System", filed Sep. 18, 2019, 68 pages.
U.S. Appl. No. 17/420,032, titled "Methods and Systems for Notifying and Mitigating a Suboptimal Event Occurring in a Transport Climate Control System", filed Jun. 30, 2021, 44 pages.
U.S. Appl. No. 17/420,037, titled "Methods and Systems for Providing Feedback for a Transport Climate Control System", filed Jun. 30, 2021, 37 pages.
U.S. Appl. No. 17/420,043, titled "Methods and Systems for Providing Predictive Energy Consumption Feedback for Powering a Transport Climate Control System Using External Data", filed Jun. 30, 2021, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,110, titled "Transport Climate Control System With a Self- Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution to Transport Climate Control Systems Amongst One or More Electric Supply Equipment Stations ", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,282, titled "Optimized Power Cord for Transferring Power to a Transport Climate Control System ", filed Sep. 9, 2019, 43 pages.
U.S. Appl. No. 16/565,235, titled "Interface System for Connecting a Vehicle and a Transport Climate Control System", filed Sep. 9, 2019, 64 pages.
U.S. Appl. No. 16/565,205, titled "Transport Climate Control System With an Accessory Power Distribution Unit for Managing Transport Climate Control Loads", filed Sep. 9, 2019, 57 pages.
U.S. Appl. No. 17/015,190, titled "Optimized Power Distribution to Transport Climate Control Systems Amongst One or More Electric Supply Equipment Stations ", filed Sep. 9, 2020, 43 pages.
U.S. Appl. No. 16/147,708, titled "Methods and Systems for Autonomous Climate Control Optimization of a Transport Vehicle", filed Sep. 29, 2018, 41 pages.
U.S. Appl. No. 16/176,667, titled "Drive Off Protection System and Method for Preventing Drive Off", filed Oct. 31, 2018, 41 pages.
U.S. Appl. No. 16/565,252, titled "Demand-Side Power Distribution Management for a Plurality of Transport Climate Control Systems", filed Sep. 9, 2019, 44 pages.
U.S. Appl. No. 17/015,194, titled "Prioritized Power Delivery for Facilitating Transport Climate Control", filed Sep. 9, 2020, 41 pages.
International Search Report and Written Opinion, issued in the PCT International Patent Application No. PCT/US2018/068136. dated Aug. 22, 2019, 14 pages.

\* cited by examiner

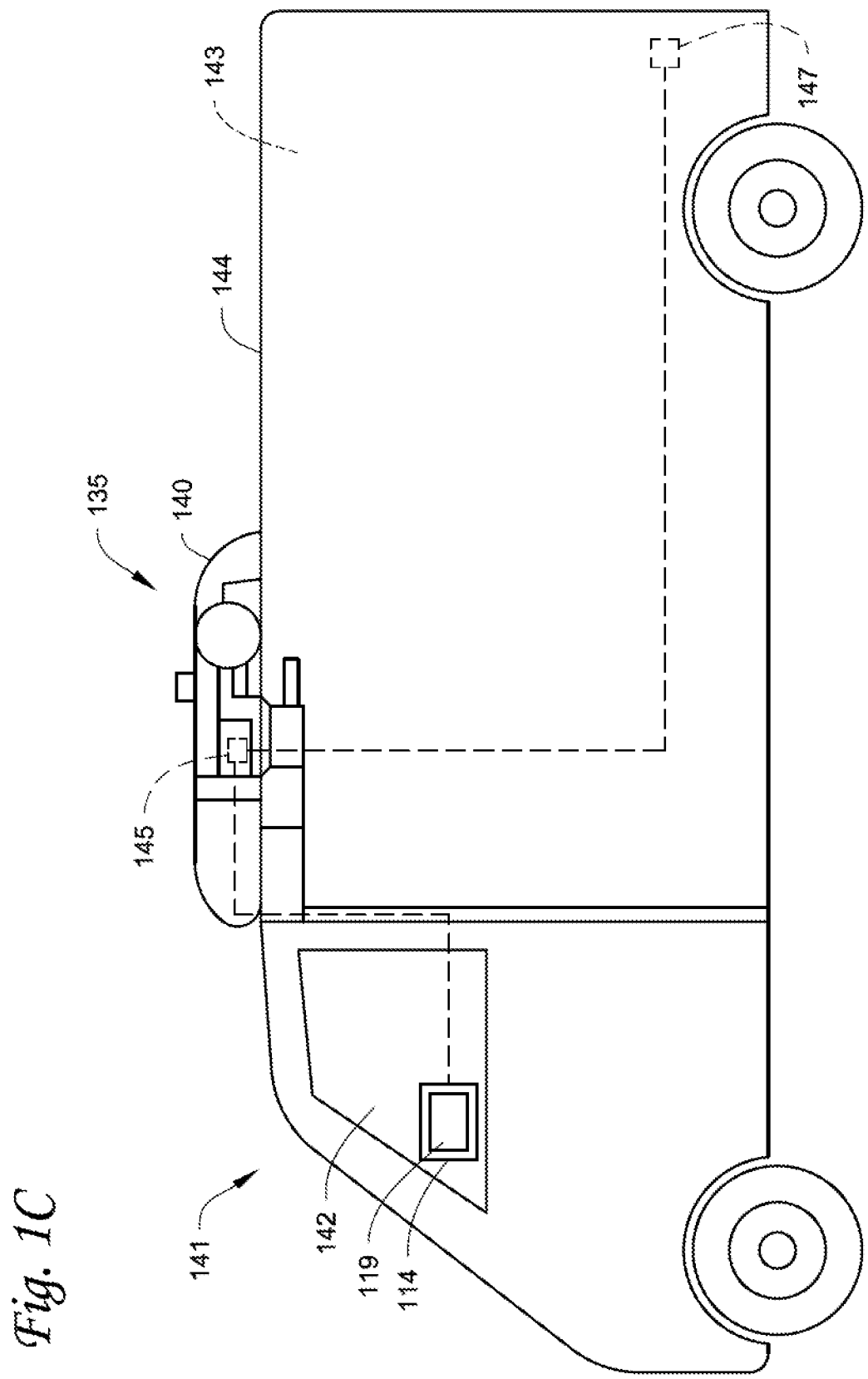

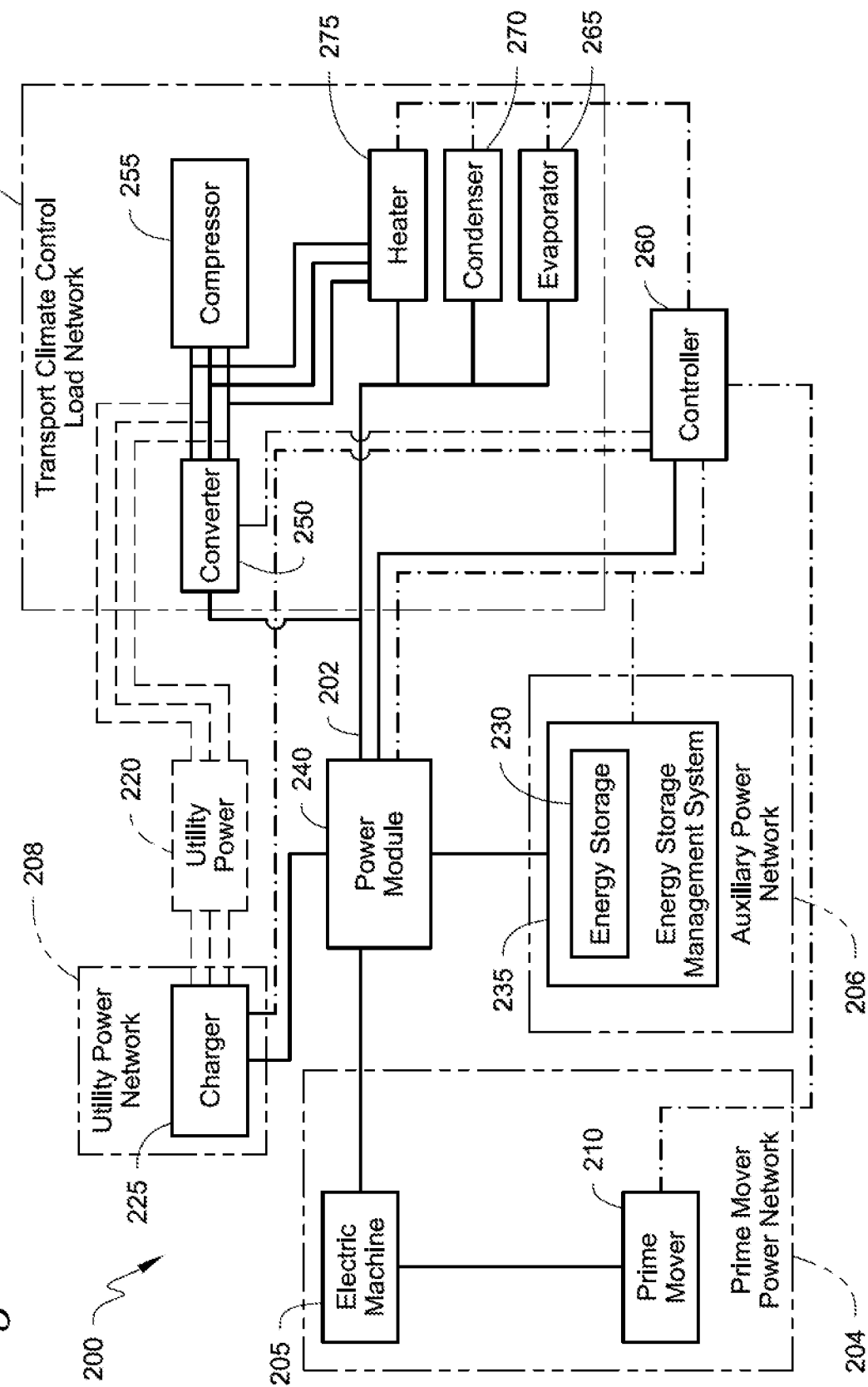

METHODS AND SYSTEMS FOR PROVIDING PREDICTIVE ENERGY CONSUMPTION FEEDBACK FOR POWERING A TRANSPORT CLIMATE CONTROL SYSTEM

FIELD

Embodiments of this disclosure relate generally to a climate control system for a transport unit. More specifically, the embodiments relate to methods and systems for providing predictive energy consumption feedback for powering a transport climate control system.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The TRS can maintain environmental condition(s) of the climate controlled space to maintain a cargo (e.g., produce, frozen foods, pharmaceuticals, etc.). In some embodiments, the transport unit can include a HVAC system to control an environmental condition (e.g., temperature, humidity, air quality, etc.) within a passenger space of the transport unit.

SUMMARY

Embodiments of this disclosure relate generally to a climate control system for a transport unit. More specifically, the embodiments relate to methods and systems for providing predictive energy consumption feedback for powering a transport climate control system.

Users of transport climate control systems can face range uncertainty regarding whether the transport climate control system has sufficient energy to maintain desired climate conditions within a climate controlled space during the duration of a route without requiring, for example, a stop for refreshing an energy storage source (e.g., charging a battery) powering the transport climate control system. Determining an expected energy consumption for the route and comparing the energy consumption to the amount of stored energy allows users to undertake routes that are known to be completed, even when there has not been an opportunity to fully refresh the energy storage source. This can increase the availability of transport vehicles to transport vehicle fleets by allowing fleet vehicles to be used even when an energy storage source powering the transport climate control system has not been fully restored, e.g. where one or more batteries powering the transport climate control system is not fully charged. Further, this can improve the ability to avoid load loss that may occur when transport climate control system runs out of energy while in transit.

In an embodiment, a method of providing predictive energy consumption feedback for powering a transport climate control system is provided. The method includes obtaining one or more route parameters. In an embodiment, the route parameters include a duration of a route. The method further includes obtaining a pre-route energy level of an energy storage source supplying power to the transport climate control system, determining, an expected energy consumption of the transport climate control system for the route based on the one or more route parameters using a controller, comparing, the expected energy consumption for the route to the pre-route energy level of the energy storage source using the controller, and displaying an alert via a human-machine interface when the expected energy consumption is greater than the pre-route energy level of the energy storage source,.

In an embodiment, the one or more route parameters further include an expected number of door openings for a space conditioned by the transport climate control system during the route. In an embodiment, the one or more route parameters further include an average duration of the door openings.

In an embodiment, the one or more route parameters further include an ambient temperature outside of the climate controlled space and a set point of the transport climate control system.

In an embodiment, the message that the route can be completed includes an indicator of an extent to which the pre-route energy level of the energy storage source exceeds the expected energy consumption.

In an embodiment, the method further includes obtaining an in-route energy level of the energy storage source while a transport unit including the transport climate control system is in transit during the route, determining, using a controller, an expected energy level of the energy storage source for current progress of the transport unit along the route, comparing the expected energy level of the energy storage source to the in-route energy level of the energy storage source, and displaying a notification via the human-machine interface when the expected energy level of the energy storage source exceeds the in-route energy level of the energy storage source. In an embodiment, determining the expected energy level of the energy storage source comprises determining an energy cost of the current progress of the transport unit along the route, and subtracting the energy cost from the pre-route energy level of the energy storage source. In an embodiment, determining the expected energy level of the energy storage source comprises obtaining an elapsed time during which the transport unit has been traveling along the route. In an embodiment, determining the expected energy level of the energy storage source further comprises obtaining a number of door openings performed during the route.

In an embodiment, a transport climate control system is provided. The transport climate control system includes a human-machine interface including a display and configured to accept input of one or more route parameters of a route for the transport unit including the transport climate control system. The transport climate control system further includes an energy storage management system configured to determine an energy level of an energy storage source. The transport climate control system also includes a controller, configured to receive the one or more route parameters, receive the energy level of the energy storage source, determine an expected energy consumption of the transport climate control system for the route based on the one or more route parameters, compare the expected energy consumption for the route to the energy level of the energy storage source, and direct the human-machine interface to present an alert via the display when the expected energy consumption is greater than the energy level of the energy storage source,.

In an embodiment, the transport climate control system is a transport refrigeration system.

In an embodiment, the energy storage source includes one or more batteries.

In an embodiment, the one or more route parameters further include an expected number of door openings for a space conditioned by the transport climate control system during the route. In an embodiment, the one or more route parameters further include an average duration of the door openings.

In an embodiment, the one or more route parameters further include an ambient temperature and a set point of the transport climate control system.

In an embodiment, the transport climate control system further includes a door sensor configured to determine when a door of a space conditioned by the transport climate control system is open or closed.

In an embodiment, the controller is also configured to obtain an in-route energy level of the energy storage source, determine an expected energy level of the energy storage source for current progress of the transport unit along the route, compare the expected energy level of the energy storage source to the in-route energy level of the energy storage source, and direct the human-machine interface to present a notification via the human-machine interface via the display when the expected energy level of the energy storage source exceeds the in-route energy level of the energy storage source. In an embodiment, the controller is further configured to determine the expected energy level of the energy storage source by determining an energy cost of the current progress of the transport unit along the route, and subtracting the energy cost from the pre-route energy level of the energy storage source. In an embodiment, the controller is further configured to obtain an elapsed time during which the transport unit has been traveling along the route. In an embodiment, the controller is further configured to obtain a number of door openings performed during the route.

DRAWINGS

References are made to the accompanying drawings that form a part of this disclosure and which illustrate embodiments in which the systems and methods described in this specification can be practiced.

FIG. 1C illustrates a side view of a van with a transport climate control system, according to one embodiment.

FIG. 2 illustrates a block diagram schematic of one embodiment of a power system for powering a transport climate control system, according to one embodiment.

DETAILED DESCRIPTION

Embodiments of this disclosure relate generally to a climate control system for a transport unit. More specifically, the embodiments relate to methods and systems for providing predictive energy consumption feedback for powering a transport climate control system.

Figure 1A:
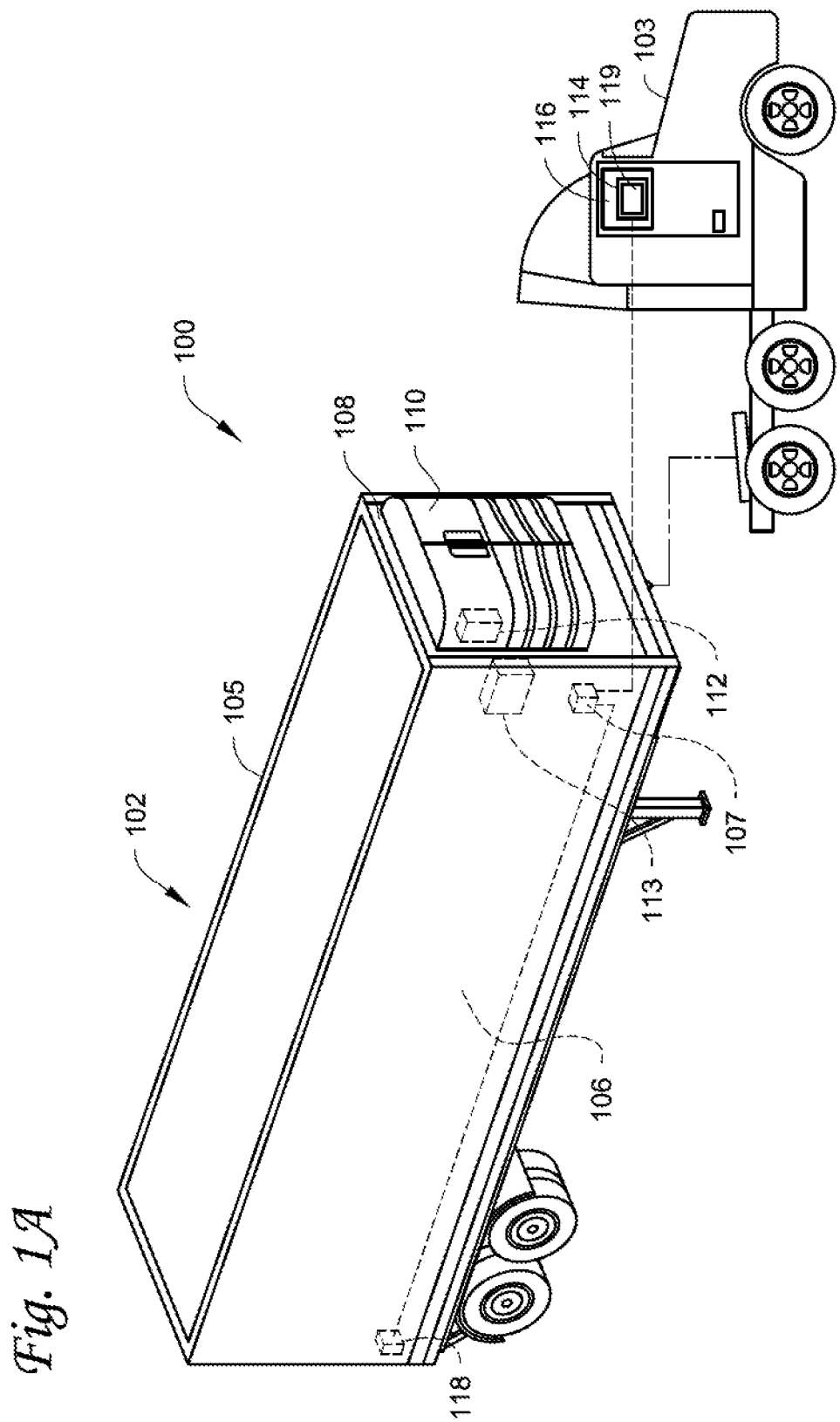
FIG. 1A illustrates a perspective view of a climate controlled transport unit with a transport climate control system attached to a tractor, according to one embodiment.

FIG. 1A illustrates one embodiment of a climate controlled transport unit 102 attached to a tractor 103. The climate controlled transport unit 102 includes a transport climate control system 100 for a transport unit 105. The tractor 103 is attached to and is configured to tow the transport unit 105. The transport unit 105 shown in FIG. 1A is a trailer. It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The transport climate control system 100 includes a climate control unit (CCU) 110 that provides environmental control (e.g. temperature, humidity, air quality, etc.) within a climate controlled space 106 of the transport unit 105. The transport climate control system 100 also includes a programmable climate controller 107 and one or more sensors (not shown) that are configured to measure one or more parameters of the transport climate control system 100 (e.g., an ambient temperature outside of the transport unit 105, a space temperature within the climate controlled space 106, an ambient humidity outside of the transport unit 105, a space humidity within the climate controlled space 106, etc.) and communicate parameter data to the climate controller 107.

The CCU 110 is disposed on a front wall 108 of the transport unit 105. In other embodiments, it will be appreciated that the CCU 110 can be disposed, for example, on a rooftop or another wall of the transport unit 105. The CCU 110 includes a transport climate control circuit (see FIG. 2) that connects, for example, a compressor, a condenser, an evaporator and an expansion valve to provide conditioned air within the climate controlled space 106.

The climate controller 107 may comprise a single integrated control unit 112 or may comprise a distributed network of climate controller elements 112, 113. The number of distributed control elements in a given network can depend upon the particular application of the principles described herein. The climate controller 107 is configured to control operation of the transport climate control system 100 including the transport climate control circuit.

A human-machine interface (HMI) 114 may be included in a cabin 116 of tractor 103. The HMI may include a display 119. HMI 114 includes a user input, for example a touchscreen, keypad, keyboard, track pad or ball, mouse, microphone configured to receive voice commands, or the like. The HMI 114 is configured to prompt a user for one or more route parameters. The HMI 114 receives input of the one or more route parameters via the user input. The one or more route parameters may include, for example, the duration of a route to be traveled by the transport unit, such as a shift length for the driver or an expected driving time for the route, a number of stops to be made along the route, for example a number of deliveries to be made by a tractor-trailer, straight truck, or van or a number of stops along a bus route, and/or an average length of a door opening, for example loading and unloading times for deliveries, an average duration allowing passengers on or off at a bus stop, or the like. In an embodiment, the HMI 114 is a mobile device such as a smart phone including an application configured to accept input of the route parameters. In an embodiment, the HMI 114 is an in-dashboard navigation system.

The HMI 114 is operatively connected to the climate controller 107. The operative connection may be wired or wireless communications, for example according to a controller area network (CAN) bus, BLUETOOTH™, 802.11 WiFi, or other such standards and using corresponding hardware. The climate controller 107 is configured to receive the one or more route parameters from HMI 114. The climate controller 107 is configured to receive the energy level of the energy storage source, for example from an energy storage management system. The climate controller 107 is configured to determine an expected energy consumption of the transport climate control system for the route based on the one or more route parameters, for example by using a lookup table correlating the one or more route parameters with energy consumption and summing the energy consumption values associated with each of the one or more route parameters.

The climate controller 107 is configured to compare the expected energy consumption for the route to the energy level of the energy storage source. The may be configured to direct the human-machine interface to present an alert via the display when the expected energy consumption is greater than the energy level of the energy storage source. The climate controller 107 may also be configured to direct the human-machine interface to present a message that the route can be completed via the display when the expected energy consumption is less than the energy level of the energy storage source.

The climate controller 107 may optionally be configured to obtain an in-route energy level of the energy storage source when the vehicle such as tractor 103 combined with climate controlled transport unit 102 are on a route. The climate controller 107 may optionally be configured to determine an expected energy level for the current progress along the route. The expected energy level may be compared to the in-route energy level by the climate controller 107. The climate controller 107 may direct display of an alert via display 119 of HMI 114 when the expected energy level exceeds the in-route energy level. In an embodiment, the expected energy level may be determined in part based on measurements obtained by the climate controller 107 from a door sensor 118.

The climate controlled transport unit 102 includes door sensor 118 located at a door (not shown) of the climate controlled space 106 and configured to determine whether the door (not shown) of climate controlled space 106 is open or closed. Door sensor 118 may be, for example, a mechanical, electrical, or optical sensor. Door sensor 118 may be in communication with the climate controller 107, for example via wired or wireless communications.

Figure 1B:
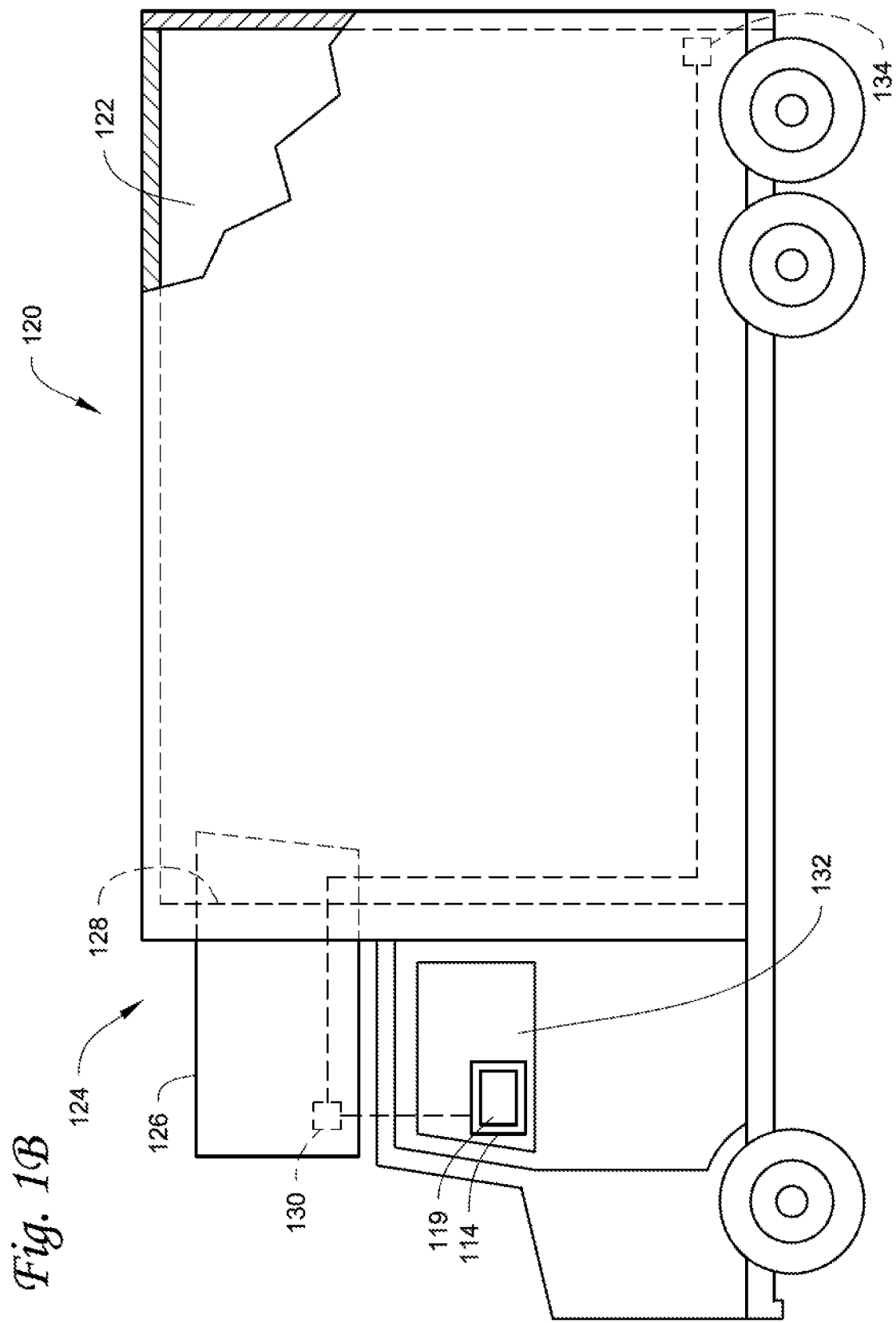
FIG. 1B illustrates a side view of a truck with a transport climate control system, according to one embodiment.

FIG. 1B depicts a temperature-controlled straight truck 120 that includes a climate controlled space 122 for carrying cargo and a transport climate control system 124. The transport climate control system 124 includes a CCU 126 that is mounted to a front wall 128 of the load space 112. The CCU 126 is controlled via a climate controller 130 to provide climate control within the climate controlled space 122. The CCU 126 can include, amongst other components, a transport climate control circuit (see FIG. 2) that connects, for example, a compressor, a condenser, an evaporator and an expansion valve to provide climate control within the climate controlled space 122.

The transport climate control system 124 also includes a programmable climate controller 130 and one or more sensors (not shown) that are configured to measure one or more parameters of the transport climate control system 124 (e.g., an ambient temperature outside of the truck 120, a space temperature within the climate controlled space 122, an ambient humidity outside of the truck 120, a space humidity within the climate controlled space 122, etc.) and communicate parameter data to the climate controller 130. The climate controller 130 is configured to control operation of the transport climate control system 124 including the transport climate control circuit.

The straight truck 120 includes a HMI 114 as described above with respect to FIG. 1A, that is located in the cabin 132 and operatively connected to the climate controller 130.

The straight truck 120 includes door sensor 134 located at a door (not shown) of the climate controlled space 122 and configured to determine whether the door (not shown) of climate controlled space 122 is open or closed. Door sensor 134 may be, for example, a mechanical, electrical, or optical sensor. Door sensor 134 is in communication with the climate controller 130, for example via a wired or wireless communication.

FIG. 1C depicts a temperature-controlled van 141 that includes a climate controlled space 143 for carrying cargo and a transport climate control system 135 for providing climate control within the climate controlled space 143. The transport climate control system 135 includes a CCU 140 that is mounted to a rooftop 144 of the climate controlled space 143. The transport climate control system 135 can include, amongst other components, a transport climate control circuit (see FIG. 2) that connects, for example, a compressor, a condenser, an evaporator and an expansion valve to provide climate control within the climate controlled space 143.

The transport climate control system 135 also includes a programmable climate controller 145 and one or more sensors (not shown) that are configured to measure one or more parameters of the transport climate control system 135 (e.g., an ambient temperature outside of the van 141, a space temperature within the climate controlled space 143, an ambient humidity outside of the van 141, a space humidity within the climate controlled space 143, etc.) and communicate parameter data to the climate controller 145. The climate controller 145 is configured to control operation of the transport climate control system 135 including the transport climate control circuit.

The temperature controlled van 141 includes an HMI 114 that is located in a cabin 142 of the temperature controlled van 141. The climate controller 145 is in communication with the HMI 114.

The temperature controlled van 141 includes door sensor 147 located at a door (not shown) of the climate controlled space 143 and configured to determine whether the door (not shown) of climate controlled space 143 is open or closed. Door sensor 147 may be, for example, a mechanical, electrical, or optical sensor. Door sensor 147 is in communication with the climate controller 145, for example via a wired or wireless communication.

Figure 1D:
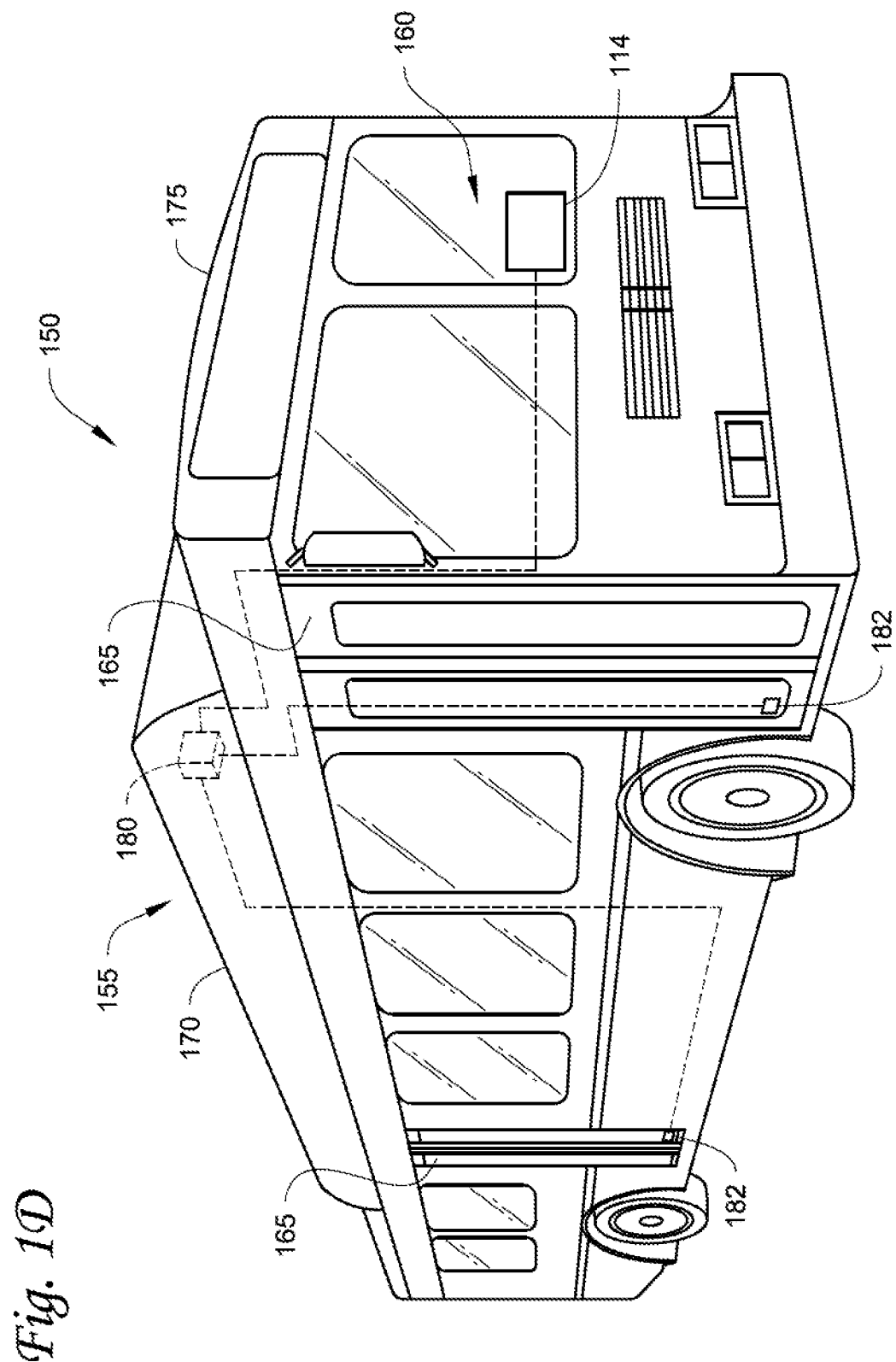
FIG. 1D illustrates a perspective view of a passenger vehicle including a transport climate control system, according to one embodiment.

FIG. 1D is a perspective view of a vehicle 150 including a transport climate control system 155, according to one embodiment. The vehicle 150 is a mass-transit bus that can carry passenger(s) (not shown) to one or more destinations. In other embodiments, the vehicle 150 can be a school bus, railway vehicle, subway car, or other commercial vehicle that carries passengers. The vehicle 150 includes a climate controlled space (e.g., passenger compartment) 160 supported that can accommodate a plurality of passengers. The vehicle 150 includes doors 165 that are positioned on a side of the vehicle 150. In the embodiment shown in FIG. 1D, a first door 165 is located adjacent to a forward end of the vehicle 150, and a second door 165 is positioned towards a rearward end of the vehicle 150. Each door 165 is movable between an open position and a closed position to selectively allow access to the climate controlled space 160. The transport climate control system 155 includes a CCU 170 attached to a roof 175 of the vehicle 150.

The CCU 170 includes a transport climate control circuit (not shown) that connects, for example, a compressor, a condenser, an evaporator and an expansion device to provide conditioned air within the climate controlled space 160. The transport climate control system 155 also includes a programmable climate controller 180 and one or more sensors (not shown) that are configured to measure one or more parameters of the transport climate control system 155 and communicate parameter data to the climate controller 180. The climate controller 180 may comprise a single integrated control unit or may comprise a distributed network of climate controller elements. The number of distributed control elements in a given network can depend upon the particular application of the principles described herein. The climate controller 180 is configured to control operation of the transport climate control system 155 including the HVAC circuit.

The vehicle 150 includes a HMI 114 as described above with respect to FIG. 1A within the climate controlled space 160. The HMI 114 can be viewable, for example, from the driver's seat (not shown). The climate controller 180 is in communication with the HMI 114.

The vehicle 150 includes door sensors 182, positioned, for example, at each of doors 165 and configured to determine whether any of doors 165 are open or closed. Door sensors 182 may be, for example, mechanical, electrical, or optical sensors. The door sensors 182 are in communication with the climate controller 180, for example via a wired or wireless communication.

FIG. 2 illustrates a block diagram schematic of one embodiment of a power system 200 for powering a transport climate control system. The power system 200 can power the transport climate control systems 100, 124, 135, 155 shown in FIGS. 1A-1D. The power system 200 includes a prime mover power network 204, an auxiliary power network 206, a utility power network 208, and a transport climate control load network 212 connected to a power conversion module 240. It will be appreciated that in some embodiments, the power system 200 can include one or more of the prime mover power network 204, the auxiliary power network 206, and/or the utility power network 208. For example, in one embodiment, the power system 200 only includes the prime mover power network 204, without the auxiliary power network 206 and/or the utility power network 208. In another embodiment, the power system 200 includes the prime mover power network 204 and the utility power network 208, without the auxiliary power network 206. The power system 200 can use one or more of the prime mover power network 204, the auxiliary power network 206 and the utility power network 208 at any given time to provide power to the transport climate control load network 212. While the power system 200 is configured to be a hybrid power system that is powered by the prime mover power network 204 in combination with the auxiliary power network 206 and/or the utility power network 208. However, it will be appreciated that the embodiments described herein can be used with a fully electric power system that does not include a prime mover or prime mover power network to provide power to the transport climate control system.

The prime mover power network 204 includes a prime mover 210 and an electric machine 205 that can provide electric power to the power conversion module 240. The prime mover 210 is configured to generate mechanical power and the electric machine 210 is configured to convert the mechanical power to electric power. The generated electric power is then sent by the prime mover power network 205 to the power conversion module 240. In some embodiments, the prime mover 210 can be a vehicle prime mover used to move the vehicle that also provides power to the transport climate control load network 212 when available. It will be appreciated that in these embodiments, mechanical power generated by the prime mover 210 that can be used in the system 200 can be inconsistent and based on operation and vehicle load requirements of the vehicle. In other embodiments, the prime mover 210 and the electric machine 205 can be part of a generator set that provides power to the transport climate control load network 212. In yet some other embodiments, the prime mover 210 and the electric machine 205 can be part of a CCU (e.g., the CCU 110, 126, 140, 170 shown in FIGS. 1A-D) to provide power to the transport climate control load network 212. It will be appreciated that in some embodiments the maximum power available from the prime mover power network 204 may never be sufficient to operate the transport climate control system operating at a full capacity.

In some embodiments, the electric machine 205 can be an electrical generator that can provide DC power to the transport climate control load network 212. In some embodiments, the electric machine 205 can include an alternator and a rectifier or an AC-DC converter (not shown) that rectifies or converts the AC power generated by the electric machine 205 to a DC power.

It will be appreciated that when the vehicle is an electric vehicle, there may be no prime mover 210. The electric machine 205 can be a motor generator that is used with a high voltage (e.g., in a range between 60V and 1500V; for example 400V, 800V, etc.) DC battery to run the vehicle. Electric vehicles can also provide a relatively high voltage (e.g., 400V, 800V, etc.) DC power source (e.g., a battery pack, a rechargeable energy storage system (RESS), etc.). Electric vehicles can include one or more DC-DC converters (e.g., two DC-DC convertors) to convert the relatively high voltage (e.g., 400V, 800V, etc.) to a low voltage (e.g., in a range between 0V and 60V; for example 12V). That is, the electric machine 205 can be replaced with a DC-DC converter having similar parameters as the electric machine 205 in order to be able to provide prime mover network power to the power conversion module 240.

In some embodiments, the electric machine 205 can provide a low voltage (e.g. 12V) from the prime mover power network 204 to the power conversion module 240 for powering the transport climate control load network 212. In some embodiments, an electric vehicle can provide for example, 7 kW-Hour energy from a 45 kW-Hour storage of the prime mover power network 204 to the power conversion module 240 to run the transport climate control load network 212. In some embodiments, the prime mover power network 204 can use take off power (e.g., electric power take off or ePTO) from the low voltage (for example, 12V) system for loads such as the power conversion module 240. The high voltage power can provide power for driving the vehicle (e.g., transmission power take off) and the power system 200 but may not take electric power from the high voltage system.

It will be appreciated that in a hybrid vehicle, there may be a machine (such as the electric machine 205) and/or a low voltage DC power source that can provide a low voltage (e.g., 12V) to the power conversion module 240.

It will be appreciated that any type of power source can provide power to the power system 200 and can be part of the prime mover power network 204. This can include, for example, the electric machine 205, a battery, a RESS, a generator, an axle-mounted generator, a power take off (PTO) device or ePTO device with an auxiliary converter, etc.

The auxiliary power network 206 includes an energy storage source 230 and an energy storage management system 235. In some embodiments, the auxiliary power network 206 can be part of the transport climate control system and potentially housed within a CCU. In other embodiments, the auxiliary power network 206 can be external to the transport climate control system and part of the prime mover power network 204. In yet some other embodiments, the auxiliary power network 206 can be external to the transport climate control system and external to the prime mover power network 204.

In some embodiments, the energy storage source 230 can include one or more batteries. For example, in one embodiment the energy storage source 230 can include two batteries (not shown). Each of the batteries can also be connected to the power conversion module 240. It will be appreciated that the energy storage source 230 can provide sufficient energy to power the transport climate control load network 212 by itself. In some embodiments, the energy storage source 230 can provide 12 VDC or 24 VDC. In other embodiments, the energy storage source 230 can provide 48 VDC.

The energy storage management system 235 is configured to monitor a charge level of one or more batteries of the energy storage source 230 and charge the one or more batteries of the energy storage source 230. The energy storage management system 235 can communicate with, for example, the controller 260 and/or a controller (not shown) of the power conversion module 240 to provide a charge level of one or more batteries of the energy storage source 230. Also, the energy storage management system 235 can receive instructions from, for example, the controller 260 and/or the controller of the power conversion module 240 indicating the amount of power from the energy storage source 230 should be supplied to the power conversion module 240.

It will be appreciated that in other embodiments, the energy storage management system 235 can be configured to monitor other parameters (e.g., monitor the fuel levels for an engine-driven system) and communicate the monitored data with, for example, the controller 260 and/or a controller (not shown) of the power conversion module 240.

The power conversion module 240 is configured to convert a power from both of the prime mover power network 204 and the auxiliary power network 206 to a load power compatible with one or more loads of the transport climate control load network 212. That is, the power conversion module 240 is configured to buck or boost power from the prime mover power network 204 and is configured to buck or boost power from the auxiliary power network 206 to obtain the desired load power. In some embodiments, the power conversion module 240 can include one or more DC/DC converters. For example, the power conversion module 240 can include one DC/DC converter to convert the power generated by the prime mover power network 204 and/or the auxiliary power network 206 to a voltage compatible with one or more loads of the transport climate control load network 212 and a second DC/DC converter to convert the auxiliary network power to a voltage compatible with one or more loads of the transport climate control load network 212. The converted power from the prime mover power network 204 and the converted power from the auxiliary power network 206 are combined to obtain a load power compatible with one or more loads of the transport climate control load network 212. The load power outputted by the power conversion module 240 can then be provided on a load DC bus 202 to the transport climate control load network 212. In some embodiments, the load power can be a low voltage DC power (e.g., between 0-60V DC). In other embodiments, the load power can be a high voltage DC power (e.g., between 60-1500V DC).

In some embodiments, the power conversion module 240 can include a controller (not shown) configured to monitor and control the power conversion module 240. In some embodiments, the controller can communicate with the controller 260.

The power system 200, and particularly the power conversion module 240, is controlled by the controller 260 of the transport climate control load network 212. The controller 260 can be, for example, the controller 107, 130, 145 and 180 shown in FIGS. 1A-D. In some embodiments, the power conversion module 240 can monitor the amount of current and/or voltage provided by the prime mover power network 204. Also, in some embodiments, the power conversion module 240 can monitor the amount of current and/or voltage drawn by components of the transport climate control load network 212. The power conversion module 240 can be configured to communicate the amount of current and/or voltage provided by the prime mover power network 204 and the amount of current and/or voltage drawn by components of the transport climate control load network 212.

Components of the transport climate control load network 212 can be, for example, part of a CCU that is mounted to the body of the vehicle (for example, truck, van, etc.). In some embodiments, the CCU can be above the cab of the truck (as shown in FIG. 1A). In another embodiment, the CCU can be on the top of the TU (for example, a top of a box where the external condensers are located) (see FIG. 1B). In some embodiments, the components of the transport climate control load network 212 can be DC powered components. In some embodiments, the components of the transport climate control load network 212 can be AC powered components. In some embodiments, the transport climate control load network 212 can include both DC powered components and AC powered components.

As shown in FIG. 2, the transport climate control load network 212 includes at least one compressor 255, one or more evaporator blowers 265, one or more condenser fans 270, the heater 275, and the controller 260. It will be appreciated that in some embodiments, the transport climate control load network 212 does not include the heater 275. It will also be appreciated that in some embodiments, the transport climate control load network 212 does not include the at least one compressor 255. It will further be appreciated that in some embodiments, the transport climate control load network 212 can include thermal management of batteries, power electronics, etc. The transport climate control load network 212 also includes an inverter 250 that is configured to boost the load power and convert the boosted load power to an AC load power. That is, the inverter 250 is configured to boost power from the DC load bus 202 and converts the power to AC power to drive the compressor 255. In some embodiments, the inverter 250 can convert the load power to a high voltage AC power. As shown in FIG. 2, the inverter 250 is configured to power the compressor 255 and optionally the heater 275. It will be appreciated that in other embodiments, the inverter 250 can power other components of the transport climate control load network 212 such as, for example, the one or more evaporator blowers 265, the one or more condenser fans 270, etc. In some embodiments, the inverter 250 can be a Compressor Drive Module (CDM).

In some embodiments, the inverter 250 can convert low voltage DC power (for example, 12 VDC, 24 VDC, 48 VDC) from the load DC bus 202 and provide AC power (for example, 230 VAC three phase, 460 VAC three phase, etc.) to drive the compressor 255. In particular, the inverter 250 drives the compressor 255 to meet demand of the transport climate control system.

The load DC bus 202 is connected to and powers each of the inverter 250, the one or more evaporator blowers 265, the one or more condenser fans 270, the heater 275, and the controller 260. It will be appreciated that the inverter 250 with the compressor 255 can require the most power of the various loads of the transport climate control load network 212. As shown in FIG. 2, in some embodiments, the inverter 250 can also power the heater 275.

The utility power network 208 is configured to charge the energy storage source 230 of the auxiliary power network 206 when, for example, the vehicle is parked and has access to a utility power source 220. In some embodiments, the utility power network 208 can also provide power to operate the transport climate control load network 212 when, for example, the vehicle is parked and has access to a utility power source. The utility power network 208 includes the AC-DC converter 225. The utility power source (e.g., shore power, etc.) 220 can be connected to the AC-DC converter 225 to provide AC power input to the AC-DC converter 225. The AC-DC converter 225 is configured to convert the AC power from the utility power source 220 and to provide converted DC power to the power conversion module 240.

While FIG. 2 shows a single AC-DC converter 225, it is appreciated that in other embodiments the power system 200 can include two or more AC-DC converters. In embodiments where there are two or more AC-DC converters, each of the AC-DC converters can be connected to the utility power 220 to provide additional power capacity to the power system 200. In some embodiments, each of the AC-DC converters can provide different amounts of power. In some embodiments, each of the AC-DC converters can provide the same amount of power.

In some embodiments, the utility power 220 can be connected directly to the compressor 255 and provide power to drive the compressor 255 thereby bypassing the inverter 250. In some embodiments, the inverter 250 can be used as an AC-DC converter and convert power received from the utility power 220 into DC power that can be provided by the inverter 250 to the load DC bus 202.

In some embodiments, the compressor 255 can be a variable speed compressor. In other embodiments, the compressor 255 can be a fixed speed (e.g., two-speed) compressor. Also, in some embodiments, the heater 275 can be configured to receive power from the inverter 250. While the compressor 255 shown in FIG. 2 is powered by AC power, it will be appreciated that in other embodiments the compressor 255 can be powered by DC power or mechanical power. Further, in some embodiments, the prime mover 210 can be directly connected (not shown) to the compressor 255 to provide mechanical power to the compressor 255.

When the compressor 255 and/or the heater 275 are powered directly by the utility power 220, the compressor 255 and/or the heater 275 can be turned on and off (e.g., operate in a start/stop mode) in order to control the amount of cooling provided by the compressor 255 and/or the amount of heating provided by the heater 275.

The controller 260 is configured to monitor and control operation of the transport climate control system. In particular, the controller 260 can control operation of the compressor 255, the heater 275, the one or more condenser fans 270, the one or more evaporator blowers 265 and any other components of the vehicle powered transport climate control system. In some embodiments, the controller 260 can monitor the amount of power drawn by the components of the transport climate control load network 212. The controller 260 can also be configured to control the power system 200. The power system 200 can also include one or more sensors (not shown) that are configured to measure one or more power parameters (e.g., voltage, current, etc.) throughout the power system 200 and communicate power parameter data to the controller 260. As shown in FIG. 2, the controller 260 can communicate with all of the components of the transport power system 200 via a communication link.

Figure 3:
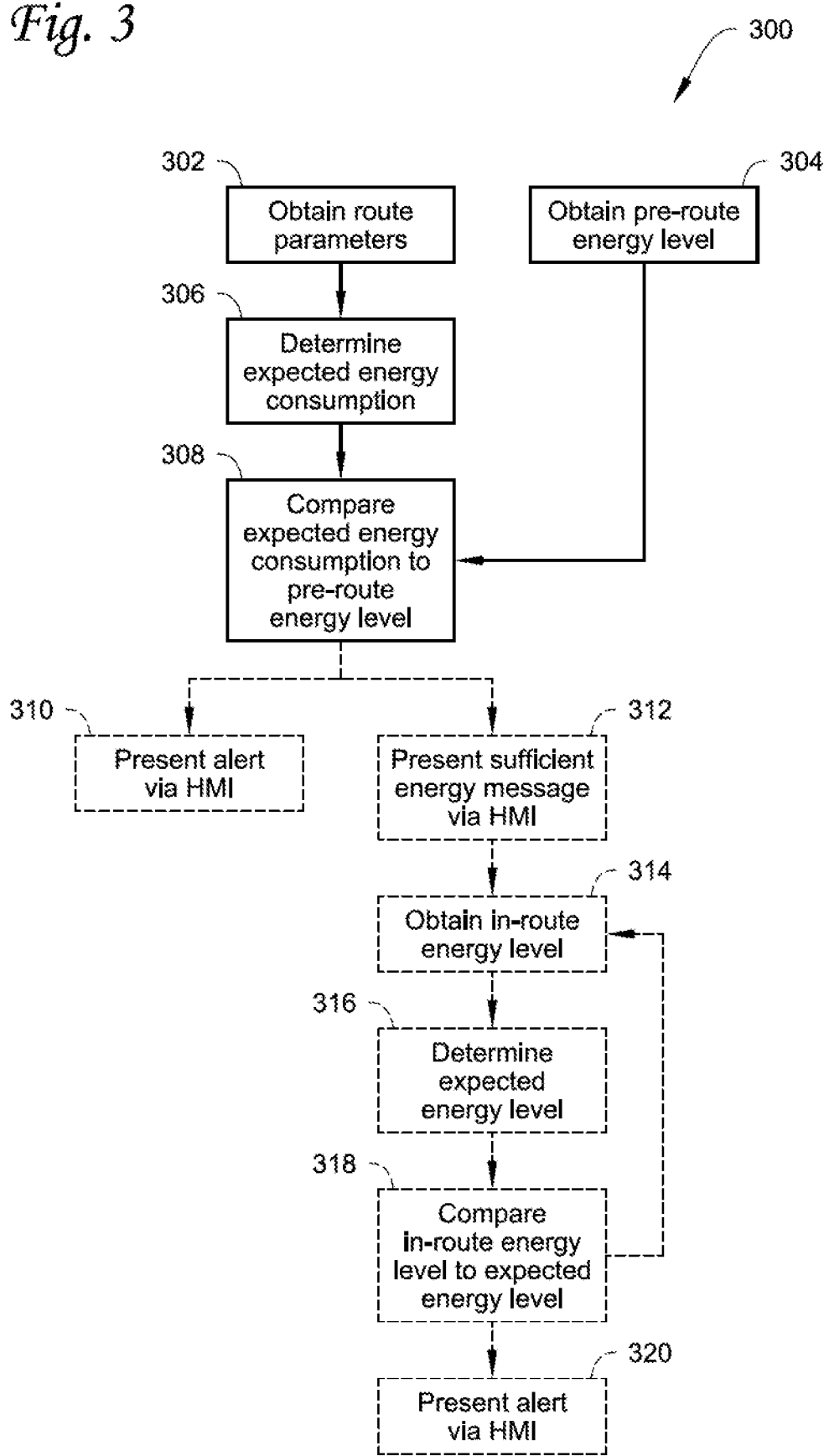
FIG. 3 is a flowchart of a method for providing predictive energy consumption feedback for powering a transport climate control system, according to an embodiment.

FIG. 3 is a flowchart of a method 300 for providing energy consumption feedback for powering a transport climate control system (e.g., the transport climate control systems 100, 124, 135, 155 shown in FIGS. 1A-1D), according to one embodiment. The transport climate control system can be powered by, for example, the power system 200 shown in FIG. 2. It will be appreciated that the method 300 can also be used with a fully electric power system that does not include a prime mover or prime mover power network to provide power to the transport climate control system.

The method begins at 302, whereby a controller (e.g., the controller 107, 130, 145, 180 shown in FIGS. 1A-D) obtains one or more route parameters. In an embodiment, the one or more route parameters are obtained from a human-machine interface (HMI) (e.g., the HMI 114 shown in FIGS. 1A-1D). The HMI may prompt a user for input of each of the one or more route parameters. The HMI may present the prompts via a display. The HMI may accept the input using one or more input devices, for example, a touch-screen, a trackpad, a keyboard, or the like. In an embodiment, the HMI may be a mobile device such as a smart phone. In an embodiment, the HMI may be a navigation system included in a vehicle including the transport climate control system. In an embodiment, the one or more route parameters may be obtained via scanning of shipping documents, for example scanning bar codes included on the shipping documents. In an embodiment, the one or more route parameters may be obtained via radio frequency identification (RFID) tags, for example RFID tags attached to cargo carried by a vehicle. In an embodiment, the one or more route parameters may be pre-loaded onto the HMI, for example via a wired or wireless data connection to a dispatching server or other hosted server, such as a freight management system or other cargo and vehicle coordination services.

The one or more route parameters may include the duration of a route to be traveled by the transport unit, such as a shift length for the driver or an expected driving time for the route. The one or more route parameters may include a number of stops to be made along the route, for example a number of deliveries to be made by a tractor-trailer, straight truck, or van or a number of stops along a bus route. The one or more route parameters may include an average length of a door opening, for example loading and unloading times for deliveries, an average duration allowing passengers on or off at a bus stop, or the like.

At 304, the controller obtains a pre-route energy level of an energy storage source. The pre-route energy level of the energy storage source may be obtained from an energy storage management system such as an energy storage management system (e.g., the energy storage management system 235 shown in FIG. 2). The energy storage source may be, for example, energy storage source 230 shown in FIG. 2. The energy storage source may include, for example, one or more batteries. In an embodiment, the energy level may be obtained by monitoring energy in and out of a node in the system, using the energy into the node to determine the energy level of the battery from a charging cycle, and using energy out of the battery to determine energy consumed since the charging cycle.

At 306, the controller determines an expected energy consumption of the transport climate control system for the route based on the one or more route parameters obtained at 302. The expected energy consumption may be determined using a mathematical model, such as a lookup table. The mathematical model may convert the one or more route parameters to energy values, such as based on predicted energy costs for climate control system run time, energy costs of door opening events, energy costs for pulldown following door opening events, and other such predicted costs. In an embodiment, these energy costs may be scaled based on the ambient temperature outside the climate controlled space. In an embodiment, the mathematical model is a lookup table. The predicted costs resulting from each of the one or more route parameters may be determined and then summed to result in the expected energy consumption for the route.

At 308, the controller compares the expected energy consumption determined at 306 to the pre-route energy level of the energy storage source obtained at 304.

When the comparison at 308 indicates that the expected energy consumption is greater than the pre-route energy level of the energy storage source, the method 300 proceeds to 310. When the comparison at 308 indicates that the expected energy consumption is less than the pre-route energy level, the method 300 may optionally proceed to 310 and/or 312.

At optional 310, the controller instructs an HMI to display an alert. The alert informs a user that the energy level is less than the expected energy consumption for the route based on the parameters entered for the route. The HMI may be HMI 114, or another interface capable of presenting the alert to a user. In an embodiment where the one or more route parameters are obtained at 302 via an HMI, the same HMI or a different HMI may be directed to display the alert at 310. The alert may be presented via a display of the HMI, for example display 119 of HMI 114. In an embodiment, the alert is a text message sent to a mobile device. In an embodiment, the alert may be provided to the user via a device operating in a hands-free mode, such as a mobile device connected to a vehicle radio system by short-range communications such as BLUETOOTH. In an embodiment, the HMI instructed to display the alert may include a status light. In an embodiment, the HMI instructed to display the alert may include one or more vehicle systems connected to the controller, such as a dashboard light, fault lamp, or a display integrated into the vehicle. In an embodiment, the alert may include an audible alarm or chime. In an embodiment, the alert may include a prompt for the user to input another set of route parameters, and the method 300 may return to 302. In an embodiment, alert may include a notice provided to a remote system, such as a dispatching system. The notice may be provided to the remote system via, for example, wireless communications.

At optional 312, the controller instructs the HMI to present a message indicating that there is sufficient energy to complete the route. Optionally, the message indicating that there is sufficient energy to complete the route may include an indication of the extent to which the energy storage source exceeds the expected energy consumption. In an embodiment, the extent to which the energy storage source exceeds the expected energy consumption may be expressed by showing the energy storage source as a percentage of the expected energy consumption. The method 300 can then optionally proceed to 314 while the transport unit is in transit.

Optionally, at 314, the controller can obtain an in-route energy level of the energy storage source from, for example, the energy storage management system. The in-route energy level is the current energy level at some point in time while in transit. The method 300 can then optionally proceed to 316. In an embodiment, the energy storage management system may push the in-route energy level to the controller. In an embodiment, the controller may be configured to regularly sample the energy storage management for the in-route energy level. In an embodiment, the in-route energy level may include one or more parameters including state of charge, voltage, discharge rate, temperature, charge rate, system faults, or other data indicative of the current state of the energy storage source. In an embodiment, the energy level may be obtained by monitoring energy in and out of a node in the system, using the energy into the node to determine the energy level of the battery from a charging cycle, and using energy out of the battery to determine energy consumed since the charging cycle.

Optionally, at 316, the controller can determine an expected energy level of the energy storage source based on the current progress of the transport unit along the route. The expected energy level may be determined by subtracting the expected energy consumption for the route up to the time at which the in-route energy level was obtained at optional 314. The expected energy consumption for the route up to that time may be determined by determining the current progress from one or more of the route parameters obtained at 302 (e.g., the time elapsed of the route duration, the number of door opening events that have occurred during the route during the time elapsed, the amount of time the door has been opened, etc.). The current progress for each of the route parameters can be input into the mathematical model used at 306. The mathematical model can output an expected energy consumption for the route up to that point based on one or more of the elapsed time, number of door openings, and duration of door opening. In an embodiment, the controller can determine an expected energy consumption amount based on each of the route parameters using the mathematical model and sum those amounts to arrive at the expected energy consumption. In an embodiment, the number of door opening events may be obtained from a door sensor of the space conditioned by the transport climate control system. In an embodiment, the duration of the door opening events may be obtained from the door sensor. The method 300 can then optionally proceed to 318.

Optionally, at 318, the controller can compare the expected energy level of the energy storage source obtained at 316 to the in-route energy level obtained at 314. When the controller determines that the expected energy level is found to exceed the in-route energy level at 318, the method 300 can optionally proceed to 320. When the controller determines that the expected energy level is found to not exceed the in-route energy level at 318, the method 300 can optionally proceed back to 314.

Optionally, at 320, the controller can instruct the HMI to display an alert on its display. The alert may indicate to a user such as a driver of the vehicle that energy consumption for the route is exceeding the predicted energy consumption at the start of the trip as determined at 308.

Aspects:

It is appreciated that any of aspects 1-9 can be combined with any of aspects 10-20.

Aspect 1. A method for providing predictive energy consumption feedback for powering a transport climate control system, the method comprising:

obtaining one or more route parameters, wherein the route parameters include a duration of a route;

obtaining a pre-route energy level of an energy storage source supplying power to the transport climate control system;

determining, using a controller, an expected energy consumption of the transport climate control system for the route based on the one or more route parameters;

comparing, using the controller, the expected energy consumption for the route to the pre-route energy level of the energy storage source; and when the expected energy consumption is greater than the pre-route energy level of the energy storage source, displaying an alert via the human-machine interface.

Aspect 2. The method according to aspect 1, wherein the one or more route parameters further include an expected number of door openings for a space conditioned by the transport climate control system during the route.

Aspect 3. The method according to aspect 2, wherein the one or more route parameters further include an average duration of the door openings.

Aspect 4. The method according to any of aspects 1-3, wherein the one or more route parameters further include an ambient temperature and a set point of the transport climate control system.

Aspect 5. The method according to any of aspects 1-4, wherein the message that the route can be completed includes an indicator of an extent to which the pre-route energy level of the energy storage source exceeds the expected energy consumption.

Aspect 6. The method according to any of aspects 1-5, further comprising:

while a transport unit including the transport climate control system is in transit during the route, obtaining an in-route energy level of the energy storage source;

determining, using the controller, an expected energy level of the energy storage source for current progress of the transport unit along the route;

comparing the expected energy level of the energy storage source to the in-route energy level of the energy storage source; and when the expected energy level of the energy storage source exceeds the in-route energy level of the energy storage source, displaying a notification via the human-machine interface.

Aspect 7. The method according to aspect 6, wherein determining the expected energy level of the energy storage source includes determining an energy cost of the current progress of the transport unit along the route, and subtracting the energy cost from the pre-route energy level of the energy storage source.

Aspect 8. The method according to any of aspects 6-7, wherein determining the expected energy level of the energy storage source includes obtaining an elapsed time during which the transport unit has been traveling along the route.

Aspect 9. The method according to aspect 8, wherein determining the expected energy level of the energy storage source further includes obtaining a number of door openings performed during the route.

Aspect 10. A transport climate control system, comprising:

a human-machine interface including a display and configured to accept input of one or more route parameters of a route for the transport unit including the transport climate control system;

an energy storage management system configured to determine an energy level of an energy storage source; and a controller, configured to:

receive the one or more route parameters from the human-machine interface;

receive the energy level of the energy storage source from the energy storage management system;

determine an expected energy consumption of the transport climate control system for the route based on the one or more route parameters;

compare the expected energy consumption for the route to the energy level of the energy storage source; and direct the human-machine interface to present an alert via the display when the expected energy consumption is greater than the energy level of the energy storage source.

Aspect 11. The transport climate control system according to claim 10, wherein the transport climate control system is a transport refrigeration system.

Aspect 12. The transport climate control system according to any of aspects 10-11, wherein the energy storage source includes one or more batteries.

Aspect 13. The transport climate control system according to any of aspects 10-12, wherein the one or more route parameters further include an expected number of door openings for a space conditioned by the transport climate control system during the route.

Aspect 14. The transport climate control system according to aspect 13, wherein the one or more route parameters further include an average duration of the door openings.

Aspect 15. The transport climate control system according to any of aspects 10-14, wherein the one or more route parameters further include an ambient temperature and a set point of the transport climate control system.

Aspect 16. The transport climate control system according to any of aspects 10-15, further comprising a door sensor configured to determine when a door of a space conditioned by the transport climate control system is open or closed.

Aspect 17. The transport climate control system according to any of aspects 10-16, wherein the controller is further configured to:

obtain an in-route energy level of the energy storage source;

determine an expected energy level of the energy storage source for current progress of the transport along the route;

compare the expected energy level of the energy storage source to the in-route energy level of the energy storage source; and direct the human-machine interface to present a notification via the human-machine interface via the display when the expected energy level of the energy storage source exceeds the in-route energy level of the energy storage source.

Aspect 18. The transport climate control system according to aspect 17, wherein the controller is configured to determine the expected energy level of the energy storage source by determining an energy cost of the current progress of the transport along the route, and subtracting the energy cost from the pre-route energy level of the energy storage source.

Aspect 19. The transport climate control system according to any of aspects 17-18, wherein the controller is further configured to obtain an elapsed time during which the transport unit has been traveling along the route.

Aspect 20. The transport climate control system according to aspect 19, wherein the controller is further configured to obtain a number of door openings performed during the route.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method for providing predictive energy consumption feedback for powering a transport climate control system configured to provide climate control to a climate controlled space for carrying cargo, comprising:
   obtaining route parameters, wherein the route parameters include a duration of a route, a number of door openings for one or more deliveries to be made during the route, an average duration of the door openings, an ambient temperature, and a set point of the transport climate control system;
   obtaining a pre-route energy level of an energy storage source supplying power to the transport climate control system;
   determining, using a processor, an expected energy consumption of the transport climate control system for the route based on expected energy costs for climate control system runtime, expected energy costs for the door openings and expected energy costs for pulldown following each of the door openings, wherein the expected energy costs for climate control system runtime, the expected energy costs for the door openings and the expected energy costs for pulldown following each of the door openings are based on the route parameters;
   comparing, using a processor, the expected energy consumption for the route to the pre-route energy level of the energy storage source; and
   when the expected energy consumption is greater than the pre-route energy level of the energy storage source, displaying an alert via a human-machine interface.

2. The method of claim 1, wherein the message that the route can be completed includes an indicator of an extent to which the pre-route energy level of the energy storage source exceeds the expected energy consumption.

3. The method of claim 1, further comprising:
   while a transport unit including the transport climate control system is in transit during the route, obtaining an in-route energy level of the energy storage source;
   determining, using a processor, an expected energy level of the energy storage source for current progress of the transport unit along the route;
   comparing the expected energy level of the energy storage source to the in-route energy level of the energy storage source; and
   when the expected energy level of the energy storage source exceeds the in-route energy level of the energy storage source, displaying a notification via the human-machine interface.

4. The method of claim 3, wherein determining the expected energy level of the energy storage source comprises determining an energy cost of the current progress of the transport unit along the route, and subtracting the energy cost from the pre-route energy level of the energy storage source.

5. The method of claim 3, wherein determining the expected energy level of the energy storage source comprises obtaining an elapsed time during which the transport unit has been traveling along the route.

6. The method of claim 5, wherein determining the expected energy level of the energy storage source further comprises obtaining a number of door openings performed during the route.

7. The method of claim 1, further comprising, when the expected energy consumption is less than the pre-route energy level of the energy storage source, presenting a message indicating that there is sufficient energy to complete the route via the human-machine interface.

8. The method of claim 7, wherein the message includes an indication of the extent to which the energy storage source exceeds the expected energy consumption.

9. The method of claim 1, further comprising:
   providing electric power from an electric machine of a prime mover power network to a power conversion module, wherein the prime mover power network further includes a prime mover; and
   communicating an amount of current and/or voltage provided by the prime mover power network and an amount of current and/or voltage drawn by components of the transport climate control system from the power conversion module to an energy storage management system; and
   wherein obtaining the pre-route energy level of the energy storage source is based on the amount of current and/or voltage drawn by components of the transport climate control system.

10. A transport climate control system, comprising:
   a human-machine interface including a display and configured to accept input of route parameters of a route for the transport unit including the transport climate control system, wherein the route parameters include a duration of a route, a number of door openings for one or more deliveries to be made during the route, an average duration of the door openings, an ambient temperature, and a set point of the transport climate control system;
   an energy storage management system configured to determine an energy level of an energy storage source; and
   a processor, configured to:
      receive route parameters;
      receive the energy level of the energy storage source;
      determine an expected energy consumption of the transport climate control system for the route based on expected energy costs for climate control system runtime, expected energy costs for the door openings and expected energy costs for pulldown following each of the door openings, wherein the expected energy costs for climate control system runtime, the expected energy costs for the door openings and the expected energy costs for pulldown following each of the door openings are based on the route parameters;

compare the expected energy consumption for the route to the energy level of the energy storage source; and direct the human-machine interface to present an alert via the display when the expected energy consumption is greater than the energy level of the energy storage source.

11. The transport climate control system of claim 10, wherein the transport climate control system is a transport refrigeration system.

12. The transport climate control system of claim 10, wherein the energy storage source includes one or more batteries.

13. The transport climate control system of claim 10, wherein the processor is configured to, when the expected energy consumption is less than the pre-route energy level of the energy storage source, instruct the human-machine interface to present a message indicating that there is sufficient energy to complete the route.

14. The transport climate control system of claim 13, wherein the message includes an indication of the extent to which the energy storage source exceeds the expected energy consumption.

15. The transport climate control system of claim 10, further comprising:

a prime mover power network including a prime mover and an electric machine configured to provide electric power to a power conversion module; and a power conversion module configured to supply power to a transport climate control load network and communicate an amount of current and/or voltage provided by the prime mover power network and an amount of current and/or voltage drawn by components of the transport climate control system, wherein the energy storage management system is configured to determine the energy level based on the amount of current and/or voltage drawn by components of the transport climate control system.

16. The transport climate control system of claim 10, further comprising a door sensor configured to determine when a door of a space conditioned by the transport climate control system is open or closed.

17. The transport climate control system of claim 10, wherein the processor is further configured to:

obtain an in-route energy level of the energy storage source;

determine an expected energy level of the energy storage source for current progress of the transport unit along the route;

compare the expected energy level of the energy storage source to the in-route energy level of the energy storage source; and direct the human-machine interface to present a notification via the human-machine interface via the display when the expected energy level of the energy storage source exceeds the in-route energy level of the energy storage source.

18. The transport climate control system of claim 17, wherein the processor is configured to determine the expected energy level of the energy storage source by determining an energy cost of the current progress of the transport unit along the route, and subtracting the energy cost from the pre-route energy level of the energy storage source.

19. The transport climate control system of claim 17, wherein the processor is further configured to obtain an elapsed time during which the transport unit has been traveling along the route.

20. The transport climate control system of claim 19, wherein the processor is further configured to obtain a number of door openings performed during the route.

* * * * *